United States Patent [19]

Phillips

[11] 4,129,789
[45] Dec. 12, 1978

[54] TOOL LOAD SENSOR AND CONTROL CIRCUIT

[76] Inventor: James D. Phillips, 548 Plymouth, Alpena, Mich. 49707

[21] Appl. No.: 653,660

[22] Filed: Jan. 30, 1976

[51] Int. Cl.² ............... H01H 35/24; H01H 45/00
[52] U.S. Cl. ........................................ 307/118; 408/6
[58] Field of Search .............. 307/118; 318/39; 408/6, 408/10, 11; 82/21 A; 60/459; 91/1; 92/5

[56] References Cited
U.S. PATENT DOCUMENTS

| 2,978,689 | 4/1961 | Tech et al. | 408/11 |
|---|---|---|---|
| 3,299,697 | 1/1967 | Sparling | 408/6 |
| 3,625,622 | 12/1971 | Wright | 408/11 |
| 3,720,120 | 3/1973 | Cutler | 318/571 |
| 4,025,218 | 5/1977 | Logan et al. | 408/10 |

FOREIGN PATENT DOCUMENTS

| 1948013 | 3/1971 | Fed. Rep. of Germany | 408/10 |
|---|---|---|---|
| 2111960 | 10/1971 | Fed. Rep. of Germany | 318/39 |

*Primary Examiner*—Robert K. Schaefer
*Assistant Examiner*—Eugene S. Indyk
*Attorney, Agent, or Firm*—Barnes, Kisselle, Raisch & Choate

[57] ABSTRACT

A machine control circuit in which the sharpness of a machine tool cutting edge is sensed as a function of the pressure in a hydraulic tool-feed cylinder, and in which the machine is automatically de-activated for tool inspection after a pass is completed when the feed pressure reaches a preselected level.

11 Claims, 2 Drawing Figures

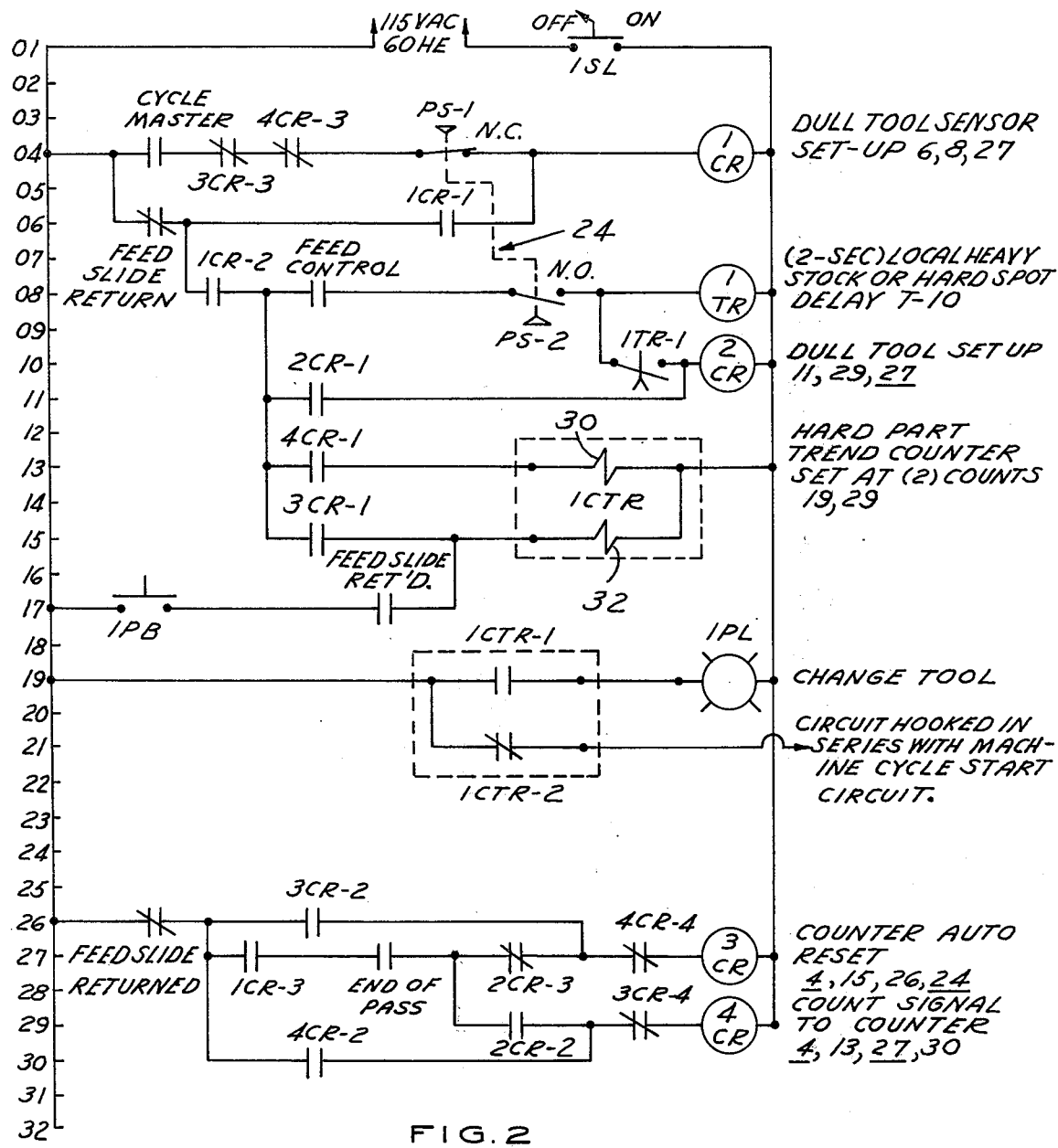
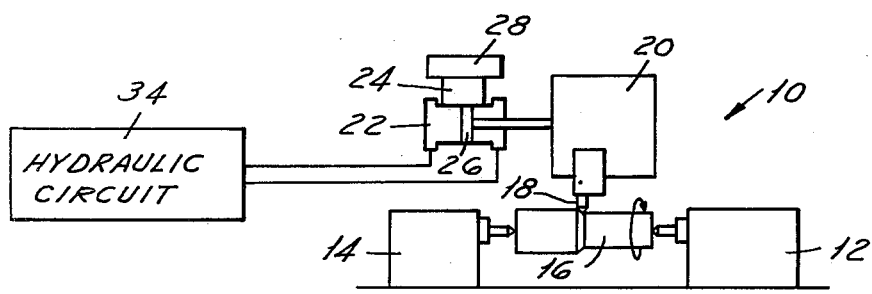

TOOL LOAD SENSOR AND CONTROL CIRCUIT

The present invention relates to machine tool control systems and, more particularly, to a circuit for automatically controlling a cutting machine when the tool cutting edge becomes dull.

It is an object of the present invention to provide a machine control circuit of the above-described type which is economical in assembly and reliable in operation; and which is able to distinguish a dull cutting tool from an abnormally hard or heavy workpiece.

More specifically, it is an object of the invention to provide a control system of the described type whch ignores the effect of small heavy or hard spots in the workpiece and/or which may cut a preselected number of successive hard or heavy pieces without signaling a dull cutting tool.

The novel features which are considered to be characteristic of the present invention are set forth in particular in the appended claims.

The invention itself, however, together with additional objects, features and advantages thereof, may be best understood from the following description whe read in conjunction with the accompanying drawings in which:

FIG. 1 is a schematic drawing of a machine tool controlled by a load sensor in accordance with the invention; and FIG. 2 is a schematic diagram of an exemplary but presently preferred embodiment of the tool load sensor and control circuit provided by the invention.

Referring to FIG. 1, a turning machine or lathe 10 includes head and tail stock supports 12, 14 adapted to rotate a workpiece 16 to be machined, and a cutting tool 18 mounted on a slide 20 and adapted for translation with respect to piece 16 under control of a hydraulic feed cylinder 22 from hydraulic circuit 34. A conventional adjustable pressure responsive switch 24 is disposed with respect to the feed drive piston 26 and is responsive to a preselected pressure differential thereacross to provide a signal to a machine control circuit 28 (FIG. 2). The hydraulic circuit 34 is designed to produce a predetermined adjustable feed rate of cylinder 22, and therefor produces a predetermined adjustable feed rate of the cutting tool during a cutting pass, with the drive pressure on the front face of piston 26 being held constant and the back pressure on the rear piston face being a function of the piece/tool contact pressure. When the cutting edge of tool 18 is sharp, the force Required to feed slide 20 remains relatively constant during a cutting pass, and the pressure across piston 26 remains below the differential threshold of switch 24. However, when the cylinder pressure differential rises above the threshold level, which may be due to either a dull tool 18 or to a hard or oversized workpiece 16, switch 24 is energized. Control circuit 28 about to be described in connection with FIG. 2 is able to distinguish between a dull tool and an initially oversized workpiece on a hard spot on the workpiece to provide an accurate and reliable indication that the cutting tool must be inspected.

Referring to FIG. 2, control circuit 28 includes control relays 1CR, 2CR, 3CR and 4CR having contact sets suitably interconnected to indicate various control conditions as will be described in detail hereinafter. Circuit 28 also includes a timed relay 1TR having delayed-closure contacts 1TR-1 to ignore a local small hard spot, and a programmable counter 1CTR to distinguish between a preselected number of successive abnormally hard or oversized pieces and a dull tool. More specifically, a dull tool sensor set-up relay 1CR having a normally open contacts 1CR-1, 1CR-2 and 1CR-3 (lines 6, 8 and 27, respectively, as numbered along the left-hand side of FIG. 2) arms the remainder of circuit 28 when the machine begins a cutting cycle during which the sensor is to be operative. A dull tool set-up relay 2CR (line 10), having normally open contacts 2CR-1 and 2CR-2 (lines 11 and 29) and normally closed contact 2CR-3 (line 27), indicates that an excess feed pressure has been detected by pressure switch 24 (FIG. 1) through pressure switch contacts PS-1 and PS-2, and that the excess pressure resulted from other than a local hard or heavy spot in the workpiece. A counter drive relay 4CR (line 29), having normally open contacts 4CR-1 and 4CR-2 (lines 13 and 30) and normally closed contacts 4CR-3 and 4CR-4 (lines 4 and 27), steps counter 1CTR at the end of each cutting pass during which an excessive feed pressure longer than the delay of relay 1TR was sensed. A fourth relay 3CR (line 27), having normally open contacts 3CR-1 and 3Cr-2 (lines 15 and 26 and normally closed contacts 3CR-3 and 3cR-4 (lines 4 and 29), resets counter 1CTR at the end of each cutting pass during which an excessive feed pressure longer than the delay of relay 1TR was not sensed. Counter 1CTR is a programmable electromechanical counter having a counting coil 30 and a reset coil 32, and is responsive t0 the count therein having been stepped to a preselected level determined by suitable programming means, such as thumbwheel switches, to close normally open contacts 1CTR-1 (line 19) and to open normally closed contacts 1CTR-2 (line 21). Contacts 1CTR-1 are connected to a dull tool lamp 1PL, anc contacts 1CTR-2 are connected in series with the start cycle switch on the machine (FIG. 1 to inhibit start of another cutting cycle after a dull tool has been detected.

Certain control and limit switches located on the machine or machine control panel have contacts connected in control circuit 28, including a set of normally open contacts the master cycle button (line 4), two sets of normally closed contacts on the slide return limit switch (lines 6 and 26), one set of normally open slide-return contacts (line 17), normally open contacts of the feed control switch (line 8) which close when rapid approach of carriage 20 (FIG. 1) ends and the tool is about to engage the workpiece at the desired cutting feed rate, and normally open contacts on the end-of-pass limit switch (lne 27). Control circuit 28 is connected to a source of 115 VAC, 60Hz power through an on/off switch 1SL.

In operation, set-up relay 1CR (line 4) is energized through contacts 3CR-3, 4CR-3 and PS-1 when power switch 1SL is in the "on" position and the master cycle control switch on the machine control panel is depressed. As soon as the slide advances, relay 1CR is latched on through contacts 1CR-1 and the closing of the slide return switch (line 6). When an excessive feed pressure occurs during a cutting pass, relay 1TR is energized via pressure switch contacts PS-2, contacts 1CR-2, the feed control switch (line 8) and the slide return switch (line 6). If the excessive pressure lasts for less than the preset delay of relay 1TR, a local heavy or hard spot is assumed and no further control action takes place. However, if the excessive pressure lasts for longer than the preset delay, preferably on the order of two seconds or more, relay 2CR is energized through contacts 1TR-1 (line 10), and is latched on through contacts 2CR-1 (line 11). At the end of the cutting pass relay 4CR is energized through contacts 2CR-2 and 3CR-4 (line 29), 1CR-3 and the end-of-pass limit switch (line 27), and the slide return switch (line 26). Relay 4CR is latched on by contacts 4CR-2 (line 30) until the feed slide is returned. Relay 3CR is not energized at the end of the cutting pass because contacts 2CR-3 (line 27) are open. Count coil 30 is energized through contacts 4CR-1 (line 13) to step the counter. It is preferable to preprogram counter 1CTR to a count of at least two, such that an excessively hard or oversized workpiece is assumed the first time relay 4CR is energized. When the feed slide is returned to its initial position, relays 1CR, 2CR and 1TR are de-energized by the slide return switch contacts (line 6), and relays 3CR and 4CR are de-energized by the return switch contacts (line 26). The operator may then unload the machined workiece, load in a new raw workpiece and push the starter cycle switch to initiate a new cutting pass.

When the cutting of the next part does not result in a dull tool set-up indication such that relay 2CR is not energized when the end-of-pass is reached, it is assumed that the previous part was odd, i.e., initially oversize or excessively hard. In this circumstance, relay 3CR is energized through contacts 4CR-4, 2CR-3, 1CR-3 and the end-of-pass switch (line 27), and is latched on by contacts 3CR-2 (line 26), to reset counter 1CTR through contacts 3CR-1 and coil 32 (line 15). Latching or holding contacts 3CR-2 and 4CR-2 are used to insure that the electromechanical counter 1CTR, which may be relatively slow, will have time to be stepped reset before rapid return of the slide to the start position, which may take on the order of two seconds. Relay 4CR is not energized because contacts 2CR-2 (line 29) are open. However, if a number of successive workpieces equal to the preset level of counter 1CTR cause relay 4CR to be energized on each pass, then counter 1CTR is stepped to its preprogrammed limit and a dull tool is indicated. Contacts 1CTR-1 close to illumiminate lamp 1PL and contacts 1CTR-2 open to inhibit initiation of a new cutting cycle. After the pass is completed and the slide has returned to its rest position, the operator may inspect and change the cutting tool, and then manually press switch 1PB to reset counter 1CTR through the feed slide return switch (line 17). Contacts 1CTR-1 are then opened and contacts 1CTR-2 are closed, such that a new cycle may be started.

From the foregoing description it will be apparent that the tool load sensor disclosed herein fully satisfied all of the objects, aims and advantages set forth above. Although the invention has been disclosed in connection with a specific embodiments thereof, many alternatives, modifications and variations will suggest themselves to persons skilled in the art. For example, although the sensor/control circuit has been disclosed in connection with a lathe shown in FIG. 1, it will be apparent that the circuit will be equally useful, without modification, with other cutting apparatus, such as drilling, milling, punching or broaching apparatus. Moreover, although the invention has been disclosed in connection with hydraulically-driven equipment, it will be apparent that the principles disclosed are equally applicable to pneumatically-driven equipment. Indeed, in its broadest aspects, the sensor/control circuit 28 (FIG. 2) may be used with little or no modification with any type of cutting machine which includes suitable means for detecting an excessive tool-feed force, indicative of a dull tool.

Furthermore, the control circuit can be readily modified to indicate hard or initially oversize parts, or parts which contain hard spots, by connection of appropriate circuitry to counting relay 4CR or to timer relay 1TR, respectively. Successive indications of oversize parts in a rough cut operation may indicate that a preliminary rough cut is needed. In operations where a long cutting tool is used, such as in a broaching operation, the disclosed. control circuit may be readily modified to indicate not only the existence but also the location of a dull cutting edge on the tool. Moreover, the control circuit may be usd as an emergency broken tool sensor by operating relay 2CR directly from contacts PS2, setting counter 1CTR to a count of one, and connecting counter contacts 1CTR-2 to an emergency circuit on the machine such that the cutting tool retracts immediately as soon as an excessive tool feed pressure is sensed.

Accordingly, the invention is intended to enbrace these and all other alternatives, modifications and variations as fall within the spirit and broad scope of the appended claims.

The invention claimed is:

1. In a machine tool for producing a cut on a workpiece, the combination comrising drive means for producing translatory movement between the workpiece and the cutting tool to produce a cut on the workpiece at a predetermined feed rate so that the force required to operate said drive means varies in accordance with the load on the cutting tool, said drive means including a drive piston coupled to the cutting tool and adapted to reciprocate the cutting tool relative to the workpiece through a predetermined stroke to effect a cutting pass on the workpiece and hydraulic fluid drive means for producing a predermined constant drive pressure on one face of said piston to displace the tool in the work-cutting direction, said hydraulic fluid drive means being adapted simultaneously to produce a back pressure on the opposing face of said piston which varies as a function of contact pressure between the cutting tool and the workpiece, pressure sensing means responsive to the pressure differential between said one face and said opposing face of said piston, and means actuated by said pressure sensing means for de-activating said drive means in response to said pressure differential exceeding a preselected threshold value.

2. The combination called for in claim 1 wherein said drives means includes means for actuating said de-activating means at the completion of a cutting pass when the de-activating means are rendered operative by said pressure sensing means.

3. The circuit set forth in claim 2 wherein said de-activating means comprises delay means to de-activate said machine only when said pressure differential exceeds said threshold for at least a preselected time duration.

4. The circuit set forth in claim 3 wherein said time is substantially equal to at least two seconds.

5. The circuit set forth in claim 2 wherein said de-activating means comprises means connected to said pressure-responsive means to count the number of cutting passes in which said pressure differential exceeds said threshold, said de-activating means being responsive to said counting means to deactivate said machine when the count in said counting means reaches a preselected number.

6. The circuit set forth in claim 5 wherein said de-activating means further comprises means responsive to completion of a cutting pass without said pressure differential having exceeded said threshold and means responsive to said last-named means to reset said counting means, whereby said machine is deactivated only after a preselected number of successive cutting passes in each of which said pressure differential exceeded said threshold.

7. The circuit set forth in claim 6 further comprising manual operator responsive reset means to reset said counting means after said tool has been replaced.

8. The circuit set forth in claim 6 wherein said de-activating means further comprises delay means to de-activate said machine only when said pressure differential exceeds said threshold for at least a preselected time.

9. The circuit set forth in claim 8 wherein said circuit further comprises means responsive to tool position to render said de-activating means operative only when said tool is engaging a workpiece.

10. The circuit set forth in claim 8 wherein said machine includes a hydraulic feed cylinder having a drive piston, and wherein said pressure-differential responsive means is responsive to the feed pressure differential across said piston.

11. The circuit set forth in claim 1 wherein said de-activating means comprises means to provide a first signal only when said pressure differential exceeds said threshold for a preselected time duration and a second signal when said pressure differential does not exceed said threshold for said preselected time duration, a counter, means responsive to said first signal to step said counter, said de-activating means being responsive to said counter to de-activate said machine when the count in said counter reaches a preselected number, means responsive to said second signal to reset said counter, and means rendering said first and second signal responsive means operative when said machine has completed a cutting pass.

* * * * *